Patented May 12, 1936

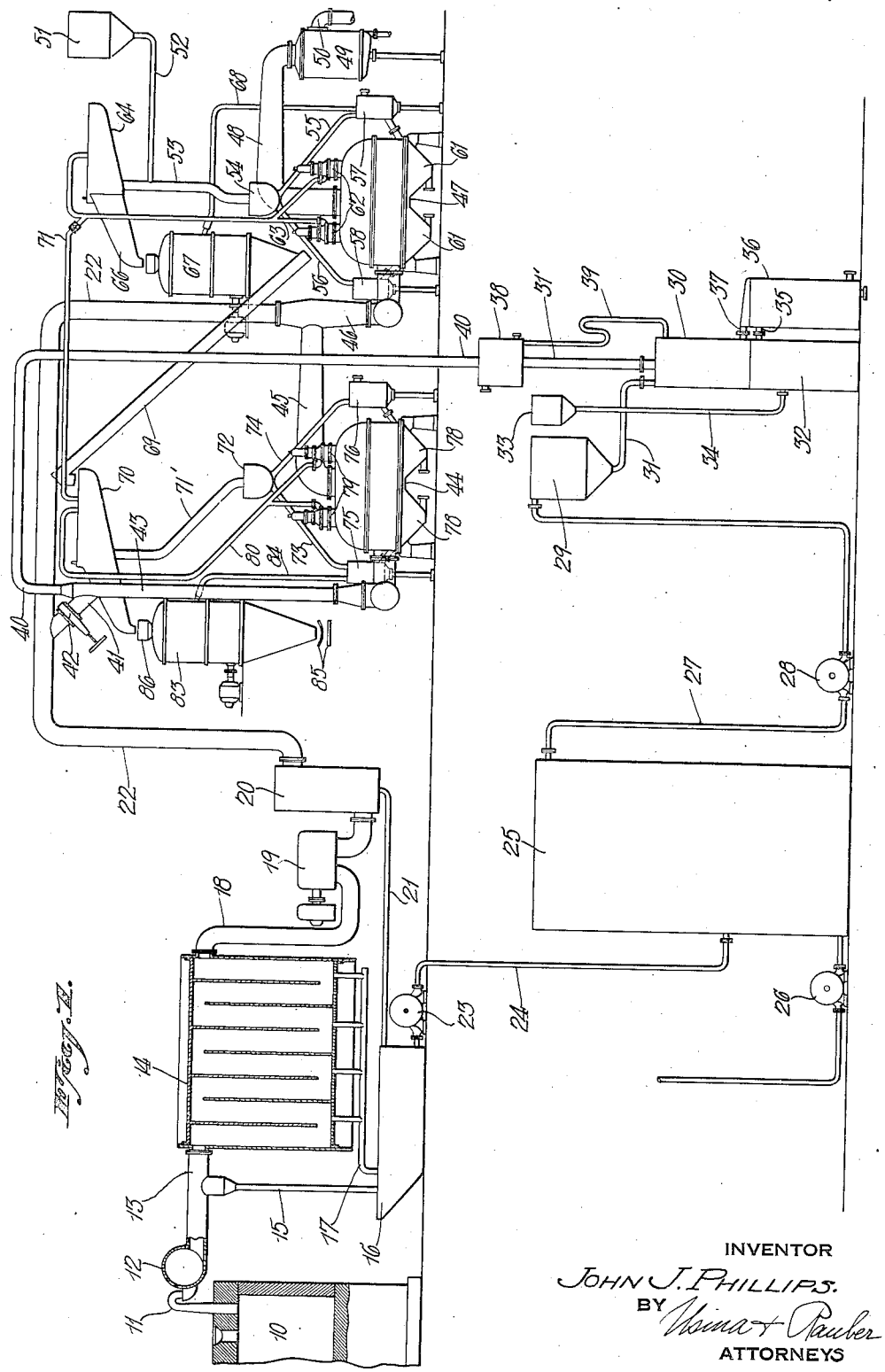

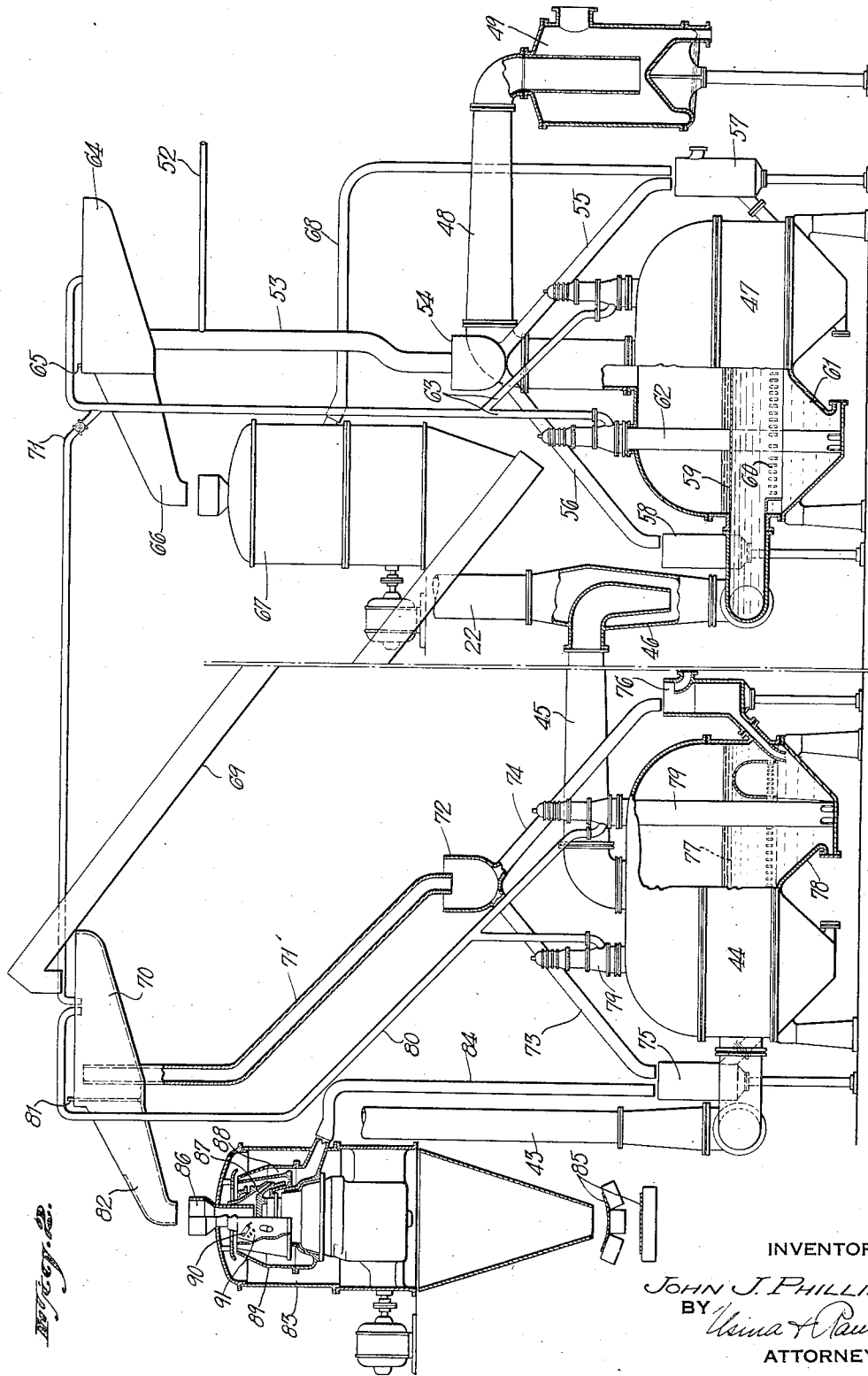

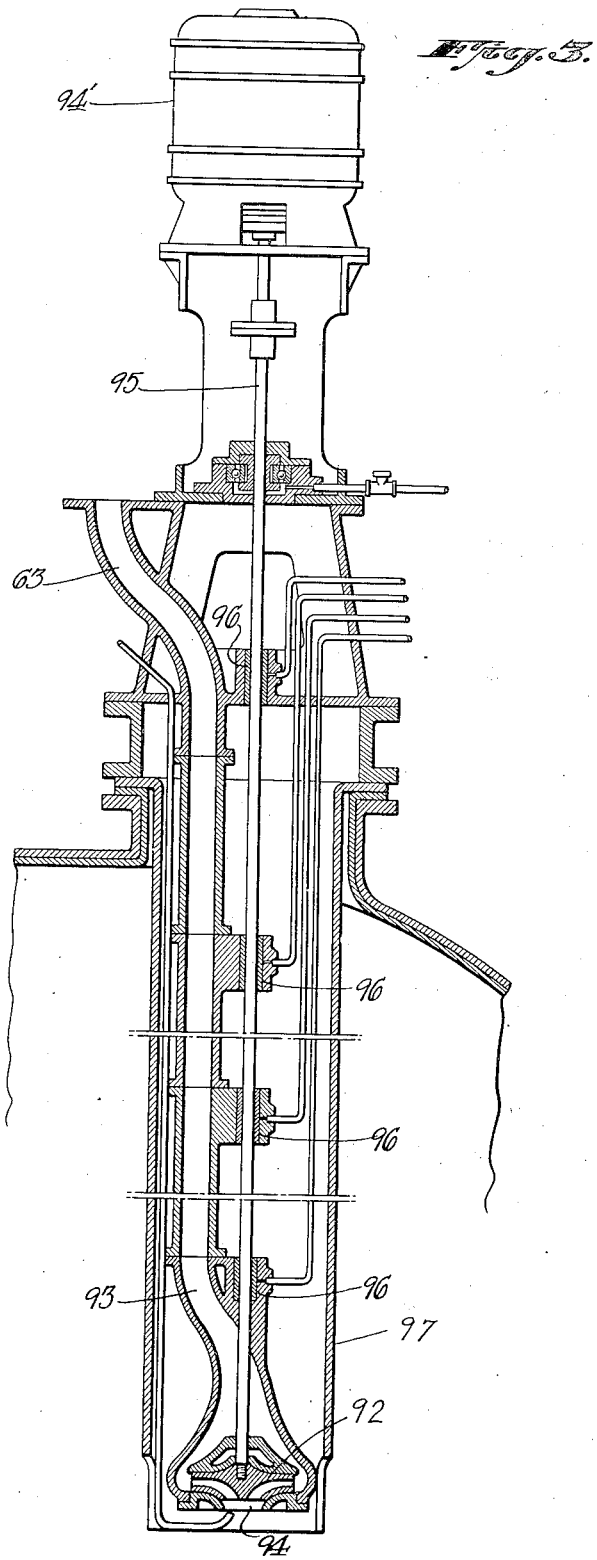

2,040,563

UNITED STATES PATENT OFFICE 2,040,563

PROCESS FOR MAKING AMMONIUM PHOSPHATES

John J. Phillips, Fairfield, Ala.

Application October 24, 1933, Serial No. 695,018

7 Claims. (Cl. 23—107)

My invention relates to the production of ammonium phosphates and more particularly to a process and an apparatus for producing solid ammonium phosphates directly from the gases resulting from the destructive distillation of coal as, for example, in by-product coke ovens.

Fuel gases generated by the coking of coal contain a small percentage of ammonia gas which has heretofore been recovered from the gases by washing or otherwise contacting the gases with a solution of sulphuric acid, thereby forming ammonium sulphate. Sulphuric acid, which is not only non-volatile at ordinary temperatures but is a strong acid, may be used to extract the ammonia down to the last traces from the gas, while itself approaching neutralization and is, therefore, an efficient agent for recovering the ammonia from the gas.

The ammonium sulphate obtained in this recovery process is not, however, the most desirable ammonium salt for many purposes. For example, in the fertilization of the soil the sulphate radical is not a fertilizing agent and when the ammonia is gradually absorbed by the growing plants a residue of sulphuric acid is left which renders the soil sour or acid. Ammonium phosphates are more desirable for this purpose because both the ammonia and the phosphorus are fertilizers and, being absorbed by the plants, do not leave a residue of non-assimilable acid.

The phosphoric acid used for the absorption of ammonia is the ortho-acid ($H_3PO_4$) and, therefore, tri-basic so that each molecule of the acid may combine with one molecule of ammonia to form the mono-phosphate, or with two molecules of ammonium phosphate to form di-ammonium phosphate, or three molecules of ammonia to form tri-ammonium phosphate.

The mono-ammonium phosphate is the most readily formed by the absorption of ammonia in the acid. As phosphoric acid is not a strong acid, it does not hold the second or third molecule of ammonia strongly. For example, if the di-ammonium phosphate, which is the more desirable for agricultural purposes than a mono-ammonium phosphate, is heated, the salt tends to decompose to mono-ammonium phosphate and free ammonia. Difficulties are, therefore, encountered in the evaporation of di-ammonium phosphate solutions to dryness without loss of ammonia.

Inasmuch as the neutralization of phosphoric acid by ammonia is an exothermic process liberating very considerable quantities of heat, it becomes necessary when a commercial ammonia product such as aqueous or concentrated ammonia liquor is used as a source of ammonia for producing phosphate, to keep close watch on the temperature of the bath during the reaction period and the use of such commercial products as named makes it also necessary to provide means for a close control of the quantity of the ammonia and also of the acid that is fed into the saturator, or else the provision of some form of external heat exchange means for maintaining the correct temperature of the bath, so that the temperature of the bath will not become high enough to dissociate the di-ammonium phosphate.

Although the di-ammonium phosphate is structurally an acid salt, the phosphoric acid is so weak that the salt does not react acid. In the mono-ammonium phosphate, although only one-third of the hydrogen of the acid has been neutralized, this salt is only slightly acid in its reaction. Consequently, ammonia would not be efficiently extracted from the coke oven, or similar, gases by being absorbed in a single step in an acid phosphate to form di-ammonium phosphate.

An object of the invention is to recover ammonia from coke oven gases and other gases resulting from the destructive distillation or coking of coal directly as ammonium phosphates, particularly as di-ammonium phosphate.

Another object of the invention is to combine ammonia gas with phosphoric acid, particularly to form ammonium phosphate in such a manner as to avoid indirect or special cooling means.

A still further object of the invention is to provide a process and an apparatus whereby the ammonium phosphates may be recovered in solid form without the necessity of evaporating an aqueous solution.

The various features of the invention are illustrated in the accompanying drawings, in which—

Fig. 1 is a diagrammatic side elevation of a by-product coke oven and a purifying apparatus embodying a preferred form of the invention.

Fig. 2 is a side elevation, partly in section, on a somewhat larger scale of the ammonia absorption apparatus.

Fig. 3 is a vertical sectional view of a pump for pumping crystals and mother liquor to a crystal separating table.

In my process the coal gases from by-product ovens or other retorts are first cooled to comparatively much lower temperatures which are necessary for good operation. This cooling may be accomplished either by indirect or direct means, preferably by a combintion of the two. As a result of this cooling, a condensate is formed which comprises an aqueous solution of dissolved ammonia. This solution is treated in stills, first to drive off the free dissolved ammonia and then with lime, or other base, to free the combined ammonia and liberate it as a gas. The gas thus formed in the ammonia stills is returned to the cooled coke oven gases after the latter have been freed from suspended particles of tar.

The uncondensed cooled gases containing the ammonia and benzol vapors are then passed into contact with phosphoric acid in a series of steps to form the di-ammonium phosphate. For this absorption step the ammonia carrying gases are separated into two streams to one of which the ammonia from the ammonia stills is added, thereby enriching or increasing the ammonia content in this stream of gas. The phosphoric acid is first brought into contact with the stream of ammonia carrying gas that has not been enriched with ammonia and is present in sufficient quantity always to maintain an acid condition and thereby efficiently to absorb the last traces of ammonia from the gas. Inasmuch as an acid condition is maintained during this absorption, the ammonium salt formed is the mono-ammonium phosphate. The concentration of the phosphoric acid is such that the concentration of the phosphate is greater than its solubility and a part of it crystallizes out. These crystals are continuously separated from the mother liquor which is returned to the absorption, and they are then re-dissolved with a small amount of water and brough into contact with the enriched fresh ammonia carrying gases in a second absorption step. In this absorption step an excess of ammonia is maintained as it is not necessary to absorb completely the ammonia from the gases. As a result of the excess of ammonia, the phosphoric acid is more nearly neutralized and di-ammonium phosphate is formed. The concentration of the mono-ammonium phosphate is sufficient to cause di-ammonium phosphate to crystallize out of solution. It is thereupon separated from the mother liquor which is returned or recirculated to the process.

Inasmuch as an excess of ammonia is maintained in the second absorption step, it is not entirely absorbed from the gas. The exhaust gases from this absorption are thereupon passed through the first or acid absorption step where the excess of acid removes the last traces of the ammonia.

In this process the phosphoric acid acts to remove the ammonia effectively and efficiently from the gases while, at the same time, in the di-ammonium phosphate absorption it provides an excess of ammonia in order to build up the di-ammonium salt.

During the absorption of the ammonia and the neutralization of the acid, a considerable quantity of heat is generated. The quantity of fuel gases passing with the ammonia through the saturators of the apparatus is, however, much larger in quantity than the ammonia itself and, being cool, has a relatively large heat absorbing capacity. The heat liberated in the combination of the acid and ammonia is, therefore, readily absorbed by this passing stream of gas and the temperature is, therefore, kept from rising to a point such as to cause dissociation of the di-ammonium phosphate.

Referring to Fig. 1 of the accompanying drawings, hot gases are withdrawn from the retorts 10 of a by-product coke oven through an outlet pipe 11 to a gas collecting main 12.

Quickly to reduce the gases from the incandescent temperatures at which they are generated, cool aqueous ammonia liquor is sprayed into the gas collecting main 12. The contact of cool liquor with hot gases causes a considerable portion of the condensable gases to precipitate and deposit condensates in the lower part of the gas collecting main and in a pipe 13 leading from said main to a primary gas cooler 14. The condensate thus formed drops through a drop pipe 15 into a collecting tank 16. The partly cooled gases then pass through primary cooler 14, which is preferably of an indirect or heat interchange type and are cooled sufficiently to condense still further quantities of tarry and aqueous constituents which are collected in the bottom of the cooler 14 and flow through a drain pipe 17 to the tank 16. The gases cooled in the cooler 14 may commonly contain entrained particles of condensed liquids and are withdrawn from the cooler 14 through an outlet pipe 18 by an exhauster 19 and passed through a tar extractor 20, which may be of any suitable type, containing impinging surfaces upon which the particles of condensed tar or water are collected. The separated particles are withdrawn from the tar extractor through a drain pipe 21 to the collecting tank 16. The gases leave the tar extractor 20 through an outlet pipe 22 substantially freed from tarry matters, but containing free ammonia gas and benzol vapors.

The liquid condensates collected in the tank 16 from mains, primary gas cooler and the tar extractor contain a considerable quantity of ammonia dissolved in water which is mixed with tar. These condensates are pumped from the tank 16 by a pump 23 through a tar line 24 to a separating tank 25 in which they are permitted to stand so that the tar may separate in a body or layer at the lower part of the tank, and the water containing dissolved ammonia and ammonium salts may collect at the upper part of the tank. The tar is withdrawn periodically or continuously from the bottom of the tank through a pump 26 to a tar storage tank. The superjacent aqueous solution is withdrawn from the upper part of the tank 25 through an overflow outlet pipe 27 and is forced by means of a pump 28 to a tank 29. The solution in this tank is a weak solution of ammonia in the form of free ammonia and combined ammonia comprised of several ammonia salts dissolved in said solution. From the tank 29 the ammonia containing liquor passes into ammonia stills to free it from its ammonia content and to return the vapors into the cooled coke oven gases before they enter the saturator.

The ammonia still may be of any suitable type. In the embodiment shown in the accompanying drawings it comprises a free ammonia still 30 into which the ammonia containing liquor from the tank 29 is led directly through a pipe 31. In the free ammonia still 30 the ammonia is brought into contact with hot vapors from a later distillation in a fixed still and, owing to this rise in temperature, ammonia escapes from the liquid and passes with the hot vapors through an outlet pipe 31'.

The liquid, partly freed of its ammonia content, reaches the lower part of the still 30 and enters into a lower part 32 of the still in which it is treated with milk of lime admitted from a supply tank 33 through a supply pipe 34. The lime, being a stronger alkali than ammonia, displaces the latter from its combination with acids and the ammonia thus liberated passes upwardly through the free ammonia still. To free it from the last traces of ammonia the liquor containing an excess of lime passes through an overflow connection 35 to a fixed ammonia still 36 in which it is heated. The action of the heat and lime serves to free any combined ammonia and to drive the ammonia from solution, causing it to pass in the form of a gas through an outlet pipe or still head 37 into the lower part of the free ammonia still 30 and thence upwardly to the outlet pipe 31'.

It will be understood that the stills 30 and 32 may be of any suitable type in which the liquor passes slowly downwardly over contact plates or surfaces while the gaseous products pass upwardly in counter-current relation.

The ammonia gases pass upwardly through the outlet pipe 31' and dephlegmator 38 in which they are cooled and separated from excess moisture, which condensate then passes downwardly through a water sealed pipe 39 to the upper part of the still 30. The cooled and dry gases then pass from the dephlegmator through a conduit 40 and join the cooled coke oven gases prior to absorption of the ammonia from the mixture of said gases by phosphoric acid.

A part of the cooled coke oven gases is withdrawn from the pipe 22 through a by-pass pipe 41 containing a control valve 42 and enters a downcomer pipe 43 into the upper end of which the ammonia from the pipe 40 is delivered. The content of ammonia in the cooled coke oven gases is thereby somewhat increased. The gases supplied through the pipe 43 thereupon enter a saturator 44 in which they come into contact with a solution of mono-ammonium phosphate which has been formed by a partial neutralization of phosphoric acid with a separate stream of cooled ammonia containing gases. The ammonia in the gases combines with the mono-ammonium phosphate to form di-ammonium phosphate and, for this purpose, an excess of ammonia is used so that it is not all absorbed in the saturator. The exhaust gases from the saturator 44, therefore, pass through an outlet pipe 45 to a discharge junction 46 into which gases are delivered from the pipe 22. The exhaust gases from the pipe 45 mix with those from the pipe 22 and enter an acid containing saturator 47 in which these gases come into contact with phosphoric acid maintained in excess so as to extract the ammonia to the last possible traces. As an acid condition is to be maintained in the saturator 47 on the mono-ammonium phosphate is formed in this saturator. The ammonia free gases pass from the saturator 47 through an outlet pipe 48 and thence through an acid separator 49 to remove entrained particles of acid, and then the gases free from ammonia are passed through a conduit 50 to a benzol recovery plant.

Phosphoric acid for the absorption of the ammonia is supplied from a supply tank 51 through a feed pipe 52 to a downflow pipe 53 leading to a breech-pot 54 from whence it passes in separate streams through the legs 55 and 56 to seal pots 57 and 58, respectively, and thence into the saturator 47. The construction of these saturators is shown in detail in Fig. 2. The phosphoric acid stands at a sufficient level to submerge a cracker or bubble pipe 59 extending from the discharge junction 46 into the saturator. This bubble pipe may be of any suitable type, but is preferably in the form of a horseshoe or U-band, connected to the delivery end of the discharge junction 46 and lying in a horizontal plane with a number of slots or openings 60 near its lower edge through which the ammonia containing gases bubble. The saturator has collecting pits 61 into which suspended crystals of mono-ammonium phosphate tend to settle. From these collecting pits the liquor containing the suspended particles are pumped by pumps 62 upwardly into pipes 63 delivering onto a drain table 64. The drain table 64 is so constructed as to catch and retain the crystals, while the mother liquor drained therefrom passes into the down flow pipe 53 and is returned to the saturator together with phosphoric acid supplied through the pipe 52.

In the above step, therefore, crystals of mono-ammonium phosphate are continuously formed and deposited on the drain table 64, while the mother liquor containing dissolved mono-ammonium phosphate and free phosphoric acid is returned to the saturator.

At periods a gate 65 on the drain table is raised to permit the crystals to pass through a spout 66 into a centrifugal separator 67 in which they are freed from the adhering mother liquor which is returned through a pipe 68 to the seal pot 57 and then returns to the saturator 47. The crystals freed from the adhering mother liquor drop to the bottom of the centrifugal machine and are conveyed by a conveyor 69 to a di-ammonium phosphate drain table 70. Initially a quantity of mother liquor is by-passed from the pipe 63 through a by-pass pipe 71 to the drain table 70 so as to form a liquid solution of mono-ammonium phosphate. From the drain table 70 the liquid solution of mono-ammonium phosphate overflows through a pipe 71' to a breech-pot 72 and thence through downwardly extending legs 73 and 74 to the seal pots 75 and 76 of the di-ammonium phosphate saturator 44. This saturator is substantially the same in construction as the saturator 47 containing a cracker or bubble pipe 77 receiving gases from the by-pass pipe 43 and bringing them into intimate contact with a solution of mono-ammonium phosphate in which the cracker pipe is submerged.

The ammonia in the gases coming into contact with the mono-ammonium phosphate saturates it and forms di-ammonium phosphate, which thereupon tends to crystallize out and settle into collecting pits 78 in the lower part of the saturator from whence it is pumped suspended in mother liquor by means of pumps 79 through the conduits 80 to the drain table 70 which is no longer supplied with mother liquor from the by-pass 71. The crystals collect on the drain table while the mother liquor overflows through pipe 71' and is returned to the saturator. When a sufficient quantity of crystals has collected on the drain table, the pumping of additional crystals is discontinued and a gate 81 is raised permitting the crystals to slide through a spout 82 to a second centrifugal machine 83. In this machine the crystals are separated from the adhering mother liquor which is returned to the seal pot 75 through a pipe 84, while the dried crystals drop downwardly through the separator into a conveyor belt 85 to be conveyed to storage.

The process is so controlled that there is a drop in pressure of the gases between the part of the pipe 22 from which the by-pass 41 is taken to the discharge junction 46, sufficient to cause the gases to flow through the saturator 44. For example, in the pipe 22 at the by-pass 41 the gases may have a pressure of 2 pounds per square inch whereas, in the discharge junction 46 this pressure may be reduced to 1⅓ pounds per square inch—a sufficient drop in pressure so that gases flow freely through the saturator 44. This leaves sufficient pressure in the gases to force them through the saturator 47 and the connections leading to the benzol recovery plant.

The centrifugal separators 67 and 83 may be of any suitable type. In the embodiment shown, the wet crystals delivered from the spout 82 are received in a hopper 86 from whence they are distributed through spouts 87 to a rapidly rotating cylindrical or conical basket 88. The liquid overflows the lower end of the basket 88 and is caught in the receiving cylinder 89 having an outlet to the pipe 84. The crystals are displaced upwardly in the basket 88 and are scraped by scrapers 90 on the outside of a central member 91, the action of the scrapers being to carry the crystals over the upper edge of the rotating basket and permit them to fall downwardly through the separator onto the belt 85.

The pumps 62 and 79, as shown in Fig. 3, may be of simple rotary type having a rotor 92 within a casing 93 so arranged that the mixture of crystals and liquid is drawn through an inlet 94 at the bottom of the casing 93 and forced upwardly through the casing which communicates with the pipe 63 or 80. The rotor 92 is rotated by means of a motor 94' at the upper end of the pump and connected to the rotor through a shaft 95 supported in oiled bearings 96 on the side of the casing 93.

While the process and apparatus have been described more particularly with reference to the formation of di-ammonium phosphate, it will be evident that they may be modified to form mono-ammonium phosphate or tri-ammonium phosphate.

By means of the process and apparatus the absorption of the ammonia to form di-ammonium phosphate, or other phosphates, takes place in the presence of large quantities of other cooled gases which are not affected by the acid and which themselves take up the heat evolved and thus prevent a troublesome rise in temperature without the necessity of temperature control of the bath by means of controlled flow of ammonia and acid or cooling said bath in heat exchange relationship with an external cooling agent. The cooling action of these gases, moreover, does not tend to dilute the phosphoric acid or phosphates and it is, therefroe, thus possible to obtain crystallized phosphates directly.

What I claim is—

1. A process of absorbing ammonia from coal distillation gases which comprises cooling said gases and freeing said gases from tar and condensible condensates, passing the cooled gases in succession into contact with unheated mono-ammonium phosphate and phosphoric acid solutions to form respectively crystals of di-ammonium phosphate and mono-ammonium phosphate, separating the crystals of mono-ammonium phosphate formed in said second saturation from the mother liquor and cyclically separating the crystals of di-ammonium phosphate formed in said first saturation, passing the resulting mother liquor from said di-ammonium phosphate through a mass of the mono-ammonium phosphate crystals to dissolve the latter, and subjecting the resulting solution to contact with said cool coal distillation gases out of contact with said mass of mono-ammonium phosphate crystals.

2. The process of claim 1 in which said coal distillation gases are enriched with ammonia recovered from the condensates formed during the cooling of said gases.

3. A process of forming di-ammonium phosphate which comprises circulating a solution of mono-ammonium phosphate solution in recurrent cycles, saturating said solution with ammonia-containing gases in a part of each cycle to form crystals of di-ammonium phosphate then separating said crystals of di-ammonium phosphate from the mother liquor in another part of said cycle, circulating the mother liquor through a mass of crystals of mono-ammonium phosphate to re-form a solution of mono-ammonium phosphate and returning said solution to the part of said cycle in which it is saturated with said ammonia-containing gases.

4. A method of forming di-ammonium phosphate which comprises saturating a solution of mono-ammonium phosphate with ammonia to form crystals of di-ammonium phosphate, circulating the resulting solution and crystals through a mass of crystals of mono-ammonium phosphate to dissolve the latter and deposit the di-ammonium phosphate crystals and returning the resulting solution to be saturated with ammonia out of contact with said mass of mono-ammonium phosphate crystals.

5. A process of forming di-ammonium phosphate which comprises circulating a solution of mono-ammonium phosphate in a cycle, saturating said solution with ammonia at one point in said cycle to form di-ammonium phosphate crystals and passing the resulting crystal-laden liquor through a mass of mono-ammonium phosphate crystals to deposit the di-ammonium phosphate crystals therein and to dissolve the mono-ammonium phosphate to enrich the solution with mono-ammonium phosphate.

6. A process of forming di-ammonium phosphate which comprises circulating a solution of mono-ammonium phosphate in a cycle, saturating said solution with ammonia at one point in said cycle to form di-ammonium phosphate crystals and passing the resulting crystal-laden liquor through a mass of mono-ammonium phosphate crystals to deposit the di-ammonium phosphate crystals therein and to dissolve the mono-ammonium phosphate to enrich the solution with mono-ammonium phosphate, thereafter centrifugally removing liquor from the di-ammonium phosphate crystals and returning said liquor to said cycle.

7. A process of forming di-ammonium phosphate which comprises circulating a solution of phosphoric acid in a cycle, absorbing ammonia in said acid in said cycle to form mono-ammonium phosphate crystals, separating said crystals in another part of said cycle, circulating a solution of mono-ammonium phosphate in a closed cycle, saturating said solution with ammonia to form di-ammonium phosphate in one part of said cycle, passing the resulting liquor and crystals through a mass of mono-ammonium phosphate crystals formed in said phosphoric acid cycle to deposit the di-ammonium phosphate crystals therein and dissolve the mono-ammonium phosphate and thereby to re-form the mono-ammonium phosphate solution and passing residual gases from said mono-ammonium phosphate solution cycle to said phosphoric acid cycle.

JOHN J. PHILLIPS.